United States Patent [19]

Chahroudi et al.

[11] 4,259,401
[45] Mar. 31, 1981

[54] METHODS, APPARATUS, AND COMPOSITIONS FOR STORING HEAT FOR THE HEATING AND COOLING OF BUILDINGS

[75] Inventors: Day Chahroudi, Tiburon; Sean R. Wellesley-Miller, San Francisco, both of Calif.

[73] Assignee: The Southwall Corporation, Palo Alto, Calif.

[21] Appl. No.: 962,366

[22] Filed: Nov. 20, 1978

Related U.S. Application Data

[63] Continuation of Ser. No. 713,314, Aug. 10, 1976, abandoned.

[51] Int. Cl.² .................. F24J 3/02; F25B 13/00; F28D 1/06
[52] U.S. Cl. ......................... 428/306; 126/429; 126/430; 165/2; 165/66; 165/132; 252/62; 428/309; 428/315; 428/696; 428/446; 428/480; 428/489; 428/689; 428/542; 428/920
[58] Field of Search ................ 165/2, 66, 132; 126/270, 428/431; 237/80; 252/62; 428/306, 308–310, 315, 446, 480, 489, 500, 522, 539, 542, 920

[56] References Cited

U.S. PATENT DOCUMENTS

| Re. 29,833 | 11/1978 | Mlavsky | 126/270 X |
|---|---|---|---|
| 1,932,502 | 10/1933 | Altenhof | 428/308 |
| 3,098,754 | 7/1963 | Dixon | 428/310 X |
| 3,849,178 | 11/1974 | Feldman | 428/920 X |
| 3,957,109 | 5/1976 | Worthington | 126/270 X |
| 4,001,126 | 1/1977 | Marion et al. | 252/62 |
| 4,031,289 | 6/1977 | Sergovic | 428/920 X |
| 4,044,819 | 8/1977 | Cottingham | 126/270 X |
| 4,148,293 | 4/1979 | Lents et al. | 126/270 |

*Primary Examiner*—Harold Ansher
*Attorney, Agent, or Firm*—Townsend and Townsend

[57] ABSTRACT

A building element which inhibits the change of the interior temperature of a building beyond prescribed limits approximating room temperature. A rigid porous matrix structure is provided in thermal communication with the building interior. A store of phase change material impregnates the matrix structure. The phase change material has a melting point within the temperature limits so that the material melts when the interior temperature of the building exceeds the temperature limits. Melting of the material absorbs heat and reduces the interior temperature of the building, until the material is entirely melted. Conversely, the material freezes when the interior temperature of the building falls below the temperature limits to release heat and increase the interior temperature until the stored material is entirely frozen. The store of phase change material is sealed within the matrix structure so that the material undergoes repeated changes in phase between liquid and solid. Accordingly, by absorbing heat when too much heat is present, and releasing heat when too little heat is present, the building element maintains the interior temperature of the building within the prescribed limits.

19 Claims, 25 Drawing Figures

METHODS, APPARATUS, AND COMPOSITIONS FOR STORING HEAT FOR THE HEATING AND COOLING OF BUILDINGS

CROSS-REFERENCE TO RELATED APPLICATIONS

This application is a continuation of our prior filed application Ser. No. 713,314, filed Aug. 10, 1976, now abandoned.

FIELD OF INVENTION

The present invention relates to novel methods, apparatus, and compositions useful in heating and cooling architectural structures, including novel building systems, materials, and architectural elements embodying phase change materials for thermal storage. More particularly, the invention relates to both structural and non-structural architectural elements containing phase change materials which have predetermined melting points, so that when such elements are incorporated into, or otherwise developed in, a building they store heat and/or cool to assist in maintaining the building interior at or near a desired temperature, typically room temperature or other temperature within the human comfort zone. Primary embodiments of the present invention involve suspension of the phase change material (hereinafter sometimes referred to as "PCM") in a rigid matrix, such as concrete or plaster; although, several secondary embodiments involve a non-rigid suspension medium, such as wood pulp. Embodiments utilizing a rigid suspension matrix include building blocks, sheet materials similar to gypsum board, and tiles for ceilings and floors, some of which serve as structural elements and other of which serve other architectural purposes. Embodiments utilizing a non-rigid suspension medium includes structural elements such as building blocks as well as non-structural architectural elements such as ceiling tiles.

The present invention also includes compositions useful in the fabrication of architectural elements and systems, as well as processes for manufacturing such compositions.

BACKGROUND OF INVENTION

Maintaining a specified climate is just as important a function of a building as the structural and shelter functions. Energy consumption for climate control is frequently the major operating expense of buildings. Various materials and systems have previously been employed to conserve heat or cool in buildings thereby reducing the energy cost. Such previous materials in systems have included large basement tanks of water, walls made from drums of water, ponds of water on tops of roofs, thick cement walls, boxes of rocks, fibre glass or other fibrous sheets of insulation, and dead air spaces as in insulating glass or other insulating panels. Previous systems have also employed phase change materials in liquid or other non-rigid suspension mediums lacking structural characteristics or otherwise failing to serve any architectural purpose in addition to its heat storage function.

Others have recognized that if the duty cycle of existing fuel fired heating, ventilation and air conditioning systems (HVAC) could be extended without offsetting costs, significant savings could be achieved. In a recent study funded by the Energy Research and Development Agency (ERDA) it was concluded that the short firing time (duty cycle) of the typical space heater in buildings is the largest single contributor to inefficiency and fuel wastage in space heating.

Others have proposed use of modular storage units using PCM to improve the duty cycle of space heaters and air conditioners, but previously it has not been possible to attain a commercially acceptable cycle life for the PCM. See Telkes, Maria, *Heating and Ventilating*, November 1949; *Refrigeration Engineering*, July 1952, Page 712; Hodgins, TW and Hoffman TW, *Canadian Journal of Technology*, Volume 33, Page 293; and *Edison Electric Institute Bulletin*, 27 (6): 250.

SUMMARY OF THE INVENTION

A phase change material utilizes the latent heat of fusion of that material for thermal storage purposes, alternately storing and releasing heat by melting and freezing. PCM thermal storage has two primary advantages over sensible thermal storage. First, PCM's have a relatively high energy density (heat of fusion). For example, Glauber's Salt (a typical PCM) stores about six (6) times as much heat as gravel. In buildings, where space is at a premium, this is a great advantage. Second, PCM's have inherent thermostatic characteristics. For example, a room surrounded by PCM (a distributed heat storage system) remains approximately at the PCM's melting point until the PCM is either all melted or all frozen.

The invention is largely concerned with packaging PCM in architectural elements, which may be structural (load bearing) such as concrete-like blocks or nonstructural, such as ceiling tiles or drywall-like sheets; although some packages of the invention which are suitable for architectural purposes can be used beneficially in non-architectural applications without departing from the invention (such as in discrete thermal storage modules).

Structural elements of the present invention deploy PCM in a rigid suspension medium, such as concrete, plaster, polymeric materials, or silica gel, to provide a novel composition for building materials with a high compressive strength and intrinsic thermostatic properties. The three essential components of the basic composition are the rigid suspension material, the PCM, and a sealing material to contain PCM in the rigid suspension medium in which the PCM is melted. Each of these three components may be selected from among a variety of different materials, which should not interact chemically with one another (except to the extent that some sealants bond in a conventional manner to the rigid medium as, for example, when applied as an external plastic coating). Such novel compositions are sometimes referred to herein as "thermal storage materials or compositions" or "PCM thermal storage materials or compositions".

The compositions of the present invention are suited for use in a variety of novel configurations and systems for storing heat and cool. Such configurations include blocks, sheets and tiles for insulation in a variety of applications including as load bearing and non-load bearing walls, flooring, ceilings, etc.

The compositions of the invention, their configurations, and the various systems in which they can be beneficially employed, are described in greater detail.

BRIEF DESCRIPTION OF DRAWINGS

FIGS. 5 through 5C are schematic diagrams of conventional HVAC installations modified by the addition of thermal storage modules. FIGS. 5 and 5A depict forced air heater and air conditioner systems, respectively whereas FIG. 5B depicts a water circulating heating and/or air conditioning system. FIG. 5C depicts a ventilating system substituting the ambient atmosphere for the heating and/or air conditioning systems of FIGS. 5–5B.

FIG. 6A depicts air flow patterns in the walls of the house of FIG. 6; whereas.

DESCRIPTION OF PREFERRED EMBODIMENTS

1. Definition of Terms

"Architectural" is used to refer to compositions, elements and systems useful in the construction of a building, including both structural and non-structural features or elements of the building.

"Structural" means having load-bearing strength.

"Non-structural" means not having load bearing strength; or not used for load bearing purposes within a building.

"Package" means to enclose or contain melted phase change material within a given element; or an element within which melted phase change material is enclosed or contained.

"Phase change material" means a substance which may be repeatedly converted between solid and liquid phases; which utilizes the latent heat of fusion of that substance to absorb, store and release heat or cool during such phase conversion; and, which does not expand appreciably upon freezing (water being perhaps the only liquid which expands appreciably upon freezing).

"Suspension medium" means a substance which is useful in reducing or eliminating phase separation problems during phase conversions of phase change materials by maintaining a large surface area between the phases so that thermodynamic equilibrium is materially enhanced or prevails.

"Load bearing" refers to materials and elements having compressive strength in excess of about 50 psi.

"Non load bearing" refers to materials and elements having compressive strength not in excess of about 50 psi.

"Distributed" means located in the user area.

"Non Distributed" means located other than in the user area.

"Structural Hydrate" means a material which, when finely divided, mixed with water, and cured, forms one or more hydrates which have compressive strengths of greater than 50 psi.

2. COMPOSITIONS EMBODYING PHASE CHANGE MATERIALS

The present invention is primarily concerned with compositions embodying phase change materials which have structural properties suitable for use in the building trades. The preferred composition is comprised of a phase change material sealed in a rigid suspension matrix.

The essential components of the composition are the phase change material, the matrix material, and the sealing material. Appropriate substances to serve as the above materials are selected according to criteria set forth below and, in addition, for their ability to coexist in the composition in different stages of cure and different phases without reacting chemically with one another, except as may occur in some instances where the sealing material is bonded to the matrix surfaces, as is customary with many sealants. In operation of the composition, (e.g. during melting and freezing of the PCM), the aforesaid essential elements of the composition interact solely in a physical (non-chemical) fashion.

Some compositions of the present invention require, in addition to the foregoing essential elements, a nucleating agent to prevent supercooling of the moltent PCM. In such compositions the nucleating agent serves as a site for initiation (nucleation) of crystal growth. In other compositions of the present invention, the matrix material itself serves the function of a nucleating agent. Selection of an appropriate nucleating agent, in addition to criteria set forth below, depends upon its ability to avoid chemical interaction with the PCM, matrix, and sealing materials except to the extent that the initiation of crystal growth of the PCM may be characterized as a chemical reaction.

Some compositions of the present invention require, in addition to the foregoing materials, the presence of a pressure control fluid to prevent destruction or deterioration of sealing material through expansion of the PCM during melting. In operation, the pressure control fluid merely changes from a liquid to a gas without chemically interacting with any of the other components.

a. Selection of Phase Change Materials

Suitable phase change materials for architectural applications typically must have low cost, appropriate melting points (i.e., having a melting point between the source temperature and the use temperature of the architectural system involved), high heat of fusion (i.e., greater than about 60 Btu/lb.), fairly high thermal conductivity (i.e., greater than about $3 \times 10^4$ calories/sec cm° C.), non-flammability, non-toxicity, and non-corrosiveness to the suspension medium and sealant.

The melting point of the PCM is selected to be between the source and use temperature of the system in order to maintain the thermal gradient that is necessary to drive heat in and out of storage. In most applications, the use temperature is actually a temperature range of several degrees and; consequently, a single PCM can be suitable for both heating and cooling. In architectural applications, the use temperature is usually room temperature (65°-85° F.), and the source temperature usually lies within the liquid range of water (32°-212° F.). Although systems with source temperatures outside this range could be used, the efficiency of such systems is significantly reduced by heat losses from the PCM storage unit and heat source.

Three categories of chemicals fulfill most of these requirements: hydrated salts, waxes, and the clathrates. Of these three categories, hydrated salts are generally most preferable.

All waxes, natural and synthetic, can be used in the composition because they do not require the presence of a nucleating agent or a suspension medium to undergo repeated freeze-thaw cycles. Nevertheless, waxes are not preferred, since they are flammable and if they are fractionated to a high enough degree to have a well defined melting point, are relatively expensive. Additionally, the thermal conductivity of waxes is relatively low which means that a large surface area is required to transport heat into and out of them.

Some clathrates are useful in the composition. Clathrates have the advantage of an unusually high heat of fusion per lb. and some can cycle indefinitely without nucleating agents or suspension media. Suitable clathrates include those which consist of either a noble gas or a non-polar fluorocarbon which forms hydrates in as little as 10% concentration. The noble gases, however, must be under several atmosphere pressure to hydrate and separate out as gases when the clathrate melts. The fluorocarbon clathrates are water soluble but tend to be relatively expensive and are, therefore, not preferred.

Nearly all hydrated salts can be employed, with various degree of suitability, as PCM. The only such materials which are wholly unsuitable are those which decompose, rather than melt. Marginally suitable hydrated salts are those which melt incongruously, those with low heats of fusion, and those with melting points which lie outside (generally far above) desired temperature ranges. Nevertheless, there are a wide variety of meltable hydrated salts with high heat of fusion and useable melting points; and many of these satisfy the stringent cost requirements of the building trade. The preferred hydrated salts are those which are formed primarily from the combination of positive ions of sodium, potassium, calcium, ammonium and iron with negative ions of silicate, chloride, nitrate, mono, di, and tri basic phosphate, mono and di basic carbonate and mono and di basic sulphate. Other ions may be added to the above combinations in small quantities, (although they are more expensive) in order to adjust melting point or to obtain other desired properties. Virtually all such combinations will function in the desired manner; and most have melting points in the useful range, for example:

$Fe_2O_3.4SO_3.9H_2O$, $NaNH_4SO_4.2H_2O$, $NANH_4HPO_4.4H_2O$, $FeCl_3.2H_2O$, $Na_3PO_4.12H_2O$, $Na_2SiO_3.5H_2O$, $Ca(NO_3)_2.3H_2O$, $K_2HPO_4, 3H_2O$, $Na_2SiO_3.9H_2O$, $Fe(NO_3)_3.9H_2O$, $K_3PO_4.7H_2O$, $NaHPO_4.12H_2O$, and $CaCl_2.6H_2O$.

The specific melting point desired is obtained by varying the degree of hydration and by alloying it to form binary or trinary eutectics.

b. Selection of Rigid Matrix

The rigid matrix can be of structural hydrates or thermosetting polymers. Concrete is generally the preferred rigid matrix; however, other satisfactory rigid matrices include plaster, silica gel and polyester resin, as described in greater detail below.

Selection of satisfactory rigid matrices depends upon several important considerations.

First, salt solutions do not ordinarily form a hydrate upon cooling unless a nucleating agent is present. By using cured cement as the rigid matrix, the need for a separate nucleating agent is eliminated. Cured hydraulic cements have a crystal structure which is irregular and sufficiently varied to nucleate crystal growth and prevent supercooling.

Second, PCM's frequently encounter phase separation which results in departure from equilibrium conditions so that the full heat of fusion is not realized. This difficulty arises because highly hydrated salts always have corresponding salts with lower degrees of hydration. When heat is withdrawn and crystals are growing, there is competition between salts having different degrees of hydration. The resulting material is a mixture of the desired salt, together with salts having lower hydration, and water. To withdraw additional heat from the mixture, it is necessary to complete the hydration of those salts having lower hydration and to use up all of the remaining water in the mixture. In repeated cycling of the phase-change material, the more readily formed precipitates interfere with completion of the reaction. However, if the phase-change material is suspended in the microscopic pores of a light-weight cement or the like, the phases do not separate since a very large surface area is maintained between the various phases. As a result, the system rapidly reaches equilibrium, allowing the full heat of fusion to be realized.

Thirdly, the rigid matrix provides physical strength whereby the composition may be incorporated into the structural portions of a building, or otherwise used in a load-bearing capacity.

Lastly, the rigid matrix, in combination with a sealing agent, serves as a package for the phase-change material, thereby, containing the phase-change material while in its liquid phase.

Satisfactory structural hydrates are those which are durable in architectural installations, and insoluble in molten PCM; and, the preferred structural hydrates are those which, in addition, are the least expensive, e.g., hydraulic cements, such as Portland cement, high alumina cement, pozzolana cement, magnesium oxychloride cement, blast furnace cement and concretes formed with any of such cements; gypsum plasters, such as plaster of Paris and casting plaster; silica gels, such as gelled sodium silicate, the gelled sodium aluminum silicates; and silicic acid. Of the foregoing, concrete formed with Portland cement is generally the most satisfactory because it is inexpensive, strong, easily worked, and readily available.

Satisfactory thermosetting polymers are those which are durable and insoluble in molten PCM, e.g., polyester resins such as polyethylene terephthalate, polyethylene diallyl phthalate; polystyrene; and epoxy resins. The polyester resins and polystyrene are preferred for their low cost.

While some PCM's, such as nearly all waxes and a few salts (e.g., zinc nitrate hexahydrate, and ammonium bromide urea eutectic) do not require a nucleating agent to cycle, other PCM's require the presence of a nucleating agent to serve as a site for the initiation of crystal growth if cycling is to occur. When the rigid matrix material is concrete, the concrete itself usually obviates the need for any further material to serve as a nucleating agent. A few other rigid matrix materials serve as nucleating agents for specific PCMs. For example, silica gel formed in the presence of crystals of calcium chloride hexahydrate (the PCM) acts as a nucleating agent for that particular PCM. Silica gel prepared in the above manner with most salts, i.e. in the presence of crystals of a particular salt, will serve as the nucleating agent for such salt when used as a PCM. On the other hand, polyester resins will not serve as nucleating agents for PCMs and, therefore, require the addition of a further ingredient. Likewise, silica gels which are not matched to specific PCMs, plasters, and other rigid matrix materials which do not themselves provide sites for initiation of crystal growth, require the addition of further ingredients to serve as nucleating agents. Such further ingredients will be selected for their ability to avoid chemical interaction with the other ingredients and for their ability to initiate crystal growth in accordance with principles known in the art.

c. Sealing Materials

Various types of sealing material are suitable for compositions in materials of the present invention. The phase-change material is sealed in a rigid matrix in one of two ways: the rigid matrix may be surrounded by a material which is impermeable to the melted phase-change material; or, a plastic emulsion or the like is added to a mixture of uncured cement and PCM which, when the mixture is cured, becomes distributed throughout the composition and, in effect, makes the entire composition waterproof. Suitable sealing materials for external coating include emulsions of polyvinylidene chloride, sand-filled polyester resin, and bitumen solutions. In one embodiment, a block containing phase-change material is first coated with a waterglass (sodium silicate) solution, which serves as a coupling agent, which is dried and then followed by a further coating of polyvinylidene chloride. In another embodiment, the polyvinylidene chloride is used to formulate a waterproof coating of thin cement mortar. As a general rule, dipcoating is the preferred technique for applying external coating of sealing material.

In the alternative embodiment, where the sealing agent is incorporated into the composition, suitable sealing agents include emulsions of polyvinylidene chloride, styrene-butadiene, polyvinyl chloride, polyvinylacetate and bitumen.

Specific examples of compositions according to the present invention which incorporate the various phase-change materials, rigid matrix materials, and sealing materials referred to above are selected according to the particular application for which the composition is intended. Specific compositions are provided by way of example throughout the remainder of this Specification.

3. ARCHITECTURAL ELEMENTS AND BUILDING MATERIALS

The foregoing compositions of the present invention may be incorporated into structural architectural elements such as building blocks and other preformed structural building elements, or they may be poured-on-site as required. Alternatively, such composition may be employed in non-structural applications such as for ceiling tile or drywall-like sheet material.

a. Building Blocks

Perhaps the most universal application of compositions according to the present invention is in the formulation and manufacture of conventional building blocks for uses similar to commercial cinder blocks and the like. The building blocks may, for example, be employed to construct the load-bearing walls of a building.

Figures 1, 2:
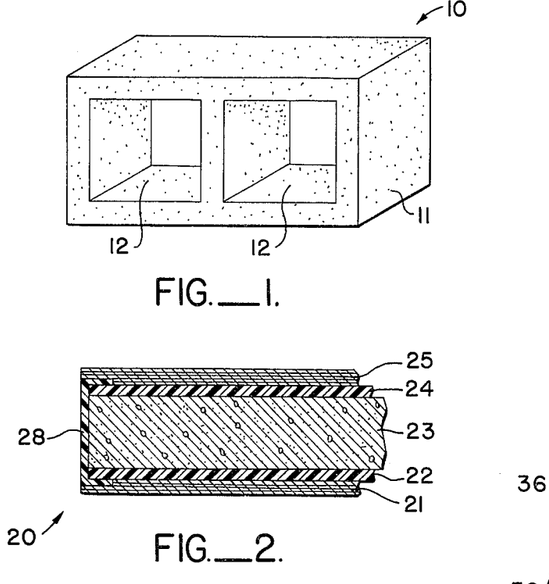
FIG. 1 is a perspective diagram of a building block formed of the structural PCM thermal storage composition of the present invention and having a pair of large parallel passages therein.
FIG. 2 is a sectional elevation of laminate building material comprised of a structural PCM thermal storage material core covered with plastic film and faced with kraft paper.
Figure 1A:
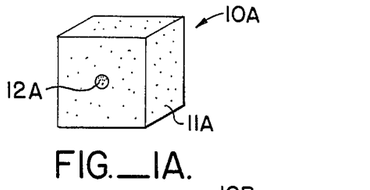
FIGS. 1A and 1B are diagrams of alternate embodiments of the building block of FIG. 1. The block of FIG. 1A has a small central cylindrical fluid passage whereas the block of FIG. 1B has a 3×3 matrix of small parallel cylindrical passages.
Figure 1B:
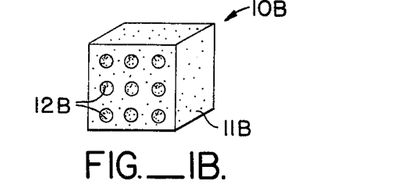

Examples of building blocks according to the present invention are illustrated in FIGS. 1, 1A and 1B of the drawings. In FIG. 1, the building block 10 consists of a block-shaped member 11 provided with two large parallel passages 12 extending wholly therethrough. FIGS. 1A and 1B depict alternate configurations 10A and 10B, respectively, consisting of block shaped members 11A and 11B, respectively, provided with passages 12A and 12B, respectively, which extend wholly through the blocks. Passage 12A is a small single, central, cylindrical conduit; and passages 12B are a 3×3 matrix of nine parallel small cylindrical conducts.

One way to produce blocks of this type is to first fill a mold with a mixture of cement, sand and phase-change material. The components are either premixed or sprayed simultaneously into the mold. Preferably, to avoid having the phase-change material interfere with curing of the cement, it is introduced into the mixture in the form of wax coated crystals. A preferred compound is as follows: one part portland cement, three parts sand, and eight parts wax covered calcium chloride crystals.

The filled mold is placed in a conventional steam curing oven for approximately one hour, thereby partially curing the mixture to the point where it is strong enough to remove from the mold. The thus-formed block is then allowed to cure outside of the mold for a few days, at which point it gains approximately one-half of its full strength. The half-cured block is then pre-coated with sodium silicate solution, which is dried and then dipped in an emulsion of polyvinylidene chloride.

In a still further method of contructing building blocks according to the present invention, a conventional cinder block having approximately 40% or more interconnected pores (blocks having up to 70% interconnected pores are available commercially and are preferred) is immersed in a solution of molten phase change material and placed in a vacuum. When the vacuum is released, liquid phase change material fills the pores of the cement. The block is then removed and an exterior coating of sealing material, such as a mortar containing a polyvinylidene chloride emulsion, is applied.

Alternatively, the block can first be coated on all surfaces, but for a small area through which the PCM is absorbed into the block under vacuum and then sealed.

Suitable porous cement blocks are formed, either by using a large amount of low density aggregate such as pumice, or by adding a foaming agent such as aluminum powder to the mixture, or by air entrainment with a surfactant. The air entrainment technique is preferred, since the use of porous, low density aggregates generally produces concrete with a relatively low degree of porosity; most but not all of the pores are interconnected; and, the strength of the block is not as great as other types of block having interconnected pores. Cement produced with a foaming agent produces a very strong low density concrete; however, the pores are not well connected and the structure is closed-celled to a large degree, thereby minimizing the amount of phase-change material that can be absorbed therein.

In the production of preferred matrices of foamed concrete by air entrainment, cement and fine sand or fly ash are mixed together with water in a standard cement mixer to produce a slurry. A surfactant such as sodium lauryl sulfate is then added, followed by high speed mixing in a foam generator. This produces a wide range of solid foams which are then steam cured in the usual manner.

It is generally preferred to use autoclaved air entrained concrete since it has been found that the main cementing agent therein is well crystalized tobermorite, $3CaO.2SiO_2.3H_2O$, which is present in a regular crystalline pattern. Air cured air entrained concrete, on the other hand, contains mainly badly crystalized tobermorite gel and is in consequence much weaker and susceptable to dehydration and hydration.

Blocks of many different sizes, shapes and configurations may be formed simply by selecting an appropriate mold.

Such blocks typically have a compressive strength of about 300 PSI and a modulous elasticity of about 250 PSI, both of which are satisfactory since blocks of this strength are conventionally used for floors and walls in the building trade. Particular installations of the foregoing building blocks in systems and processes according to the present invention are described hereinafter.

b. Laminate Building Materials.

The laminate building materials of the present invention are analogous to sheet rock or a drywall commonly used in a conventional wood frame construction. As shown in FIG. 2, the laminate building material 20 of the present invention can be constructed of multiple layers arranged in the following order: a first layer of heavy kraft paper 21, plastic film moisture barrier 22, thermal storage composition 23 according to the present invention, further plastic film 24, and a further layer of kraft paper 25. The laminate building material 20 thus consists of paper tensile elements surrounding a layer of phase-change material sealed in a rigid matrix. The physical properties of the laminate 20 are comparable to conventional sheet rock, except that it is slightly heavier since the thermal storage layer 23 is slightly more dense than plaster. The PCM thermal storage material layer 23 can be formed in several different ways.

For example, in one embodiment, the rigid matrix is air entrained porous concrete having in excess of 40% interconnected pores; and such pores are filled with a suitable phase-change material such as calcium chloride. The filled matrix is coated with a sodium silicate solution which forms a hard glassy continuous film on the matrix surface which is both chemically and mechanically adherent thereto. The chemical reaction proceeds as follows:

$Na_2SiO_3 + H_2O \rightarrow NaOH + SiO_2$.

The NaOH leaches out and the $SiO_2$ reacts with the free lime in the cement as follows:

$3CaO + SiO_2 \rightarrow 3CaO.SiO_2$ to form an outer film which is impermeable to water and has a well defined crystal structure.

The same effect can be achieved by using a solution of either zinc or magnesium silico-fluoride which reacts as follows: $ZnSiF_6 + Ca(OH)_2 \rightarrow CaSiF_6 + ZnO + H_2O$. The $CaSiF_6$ forms a firm and impermeable coating which covers the surface of the concrete and fills its surface capillaries. Alternatively, silicon fluoride gas can be used, which follows the reaction:

$2SiF_4 + 2Ca(OH)_2 \rightarrow CaSiF_6CaF_2 + SiO_2 + 2H_2O$.

The so-prepaed PCM thermal storage material is formed in layers, preferably between one-quarter and one inch thick. The plastic film 22, 24 retains moisture in the core 23 and the two kraft paper skins 25 and 21 provide structural integrity. The chemical reactions described above for treating the core 23 (i.e. with sodium silicate solution, zinc or magnesium silicofluoride, or silicon fluoride gas) provide the sealant films 24 and 22 and also act to insure a good bond to the kraft paper 21, 25.

Figure 2A:
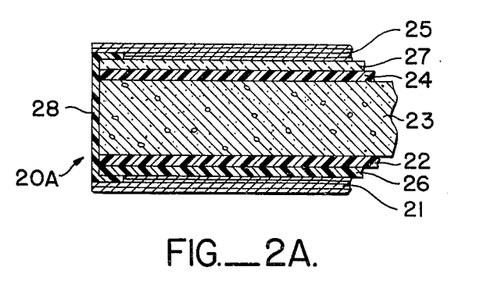
FIG. 2A is a sectional elevation of an alternate embodiment of the laminate of FIG. 2 wherein the plastic sealant is comprised of an interior plastic coating covered with a layer of polyvinyl chloride.

If additional protection beyond the plastic films described above is required, a polyvinylidene plastic water barrier can be added as an extra protective layer between the coating 22, 24 and the kraft paper 21, 25. This construction is shown in FIG. 2A wherein the laminate 20a is comprised of a PCM thermal storage material core 23 covered with an inorganic coating 22, 24 of the type described above in connection with FIG. 2, polyvinylidene chloride layers 26 and 27, and kraft paper layers 21, 25. The glassy inorganic coating 22, 24 is coated with an acrylic pressure sensitive adhesive in solution form which has 5% polyvinylmethyl ether added to insure a good bond in the presence of water. The kraft paper is laminated by heat and pressure with a 2 mil polyvinylidene chloride film. This film forms the actual moisture barrier. The laminated kraft paper 21, 25 is bonded to both sides of the adhesive treated member in a press.

Moisture is prevented from escaping the edges of the panels 20, 20a by taping them with a waterproof tape 28 before the kraft paper 21, 25 is applied.

In an alternate embodiment, the laminate building material of the present invention, as shown in FIGS. 2 and 2A can be manufactured with a structural PCM thermal storage material 23 which is formed, not by filling a porous precured slab of rigid matrix material with PCM, but by admixing, cement, sand and phase-change material in a fashion similar to that described in connection with manufacturing the building block of FIG. 1. In particular, the kraft paper 21, 25 is laminated with polyvinylidene chloride, which is then coated with acrylic adhesive and then with a sodium silicate solution which has been thickened with flumed silica. A layer of uncured liquid PCM thermal storage material is coated to the required thickness on top of the sodium silicate coating. Preferably, the uncured PCM thermal storage material consists of one part Portland cement, three parts sand, and eight parts wax encapsulated calcium chloride crystals. On top of the uncured PCM thermal storage material, another layer of kraft paper is applied which has been given the same adhesive treatment as the previously applied layer of kraft paper. Preferably, the cure rate of the PCM thermal storage material 23 is enhanced by either adding 2% calcium chloride to the mixture or by not adding calcium sulfate and calcium oxide to the cement when it is formulated. Cure is effected by heat and/or air and, once cured, the laminate is sealed with tape 28 around its edges.

Laminate building materials of the type shown in FIGS. 2 and 2A are glued to the studs or other supporting member, rather than nailed, to prevent puncture of the moisture barrier.

c. Ceiling and Wall Tiles.

Figure 3:
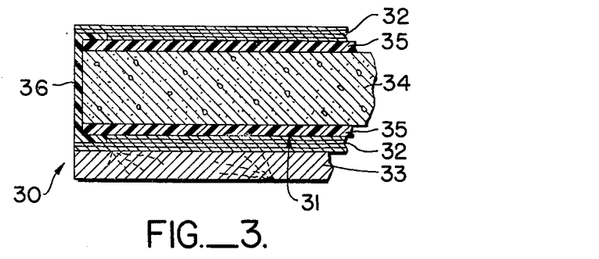
FIG. 3 is a sectional elevation of a further alternate embodiment of the laminate of FIG. 2, differing primarily by the inclusion of an outer layer of acoustic material.

FIG. 3 depicts an acoustic tile 30, suitable for ceilings and/or walls, which is a laminate comprised of an inner layer of structural PCM thermal storage material according to the present invention 31, and outer layers of tensile facing material 32. The tile 30 further includes an acoustic layer 33 distributed on one face i.e. applied to one of the layers of kraft paper 32. The main portion of the tile 30 may be constructed in the same manner as the laminate building material described in connection with FIGS. 2 and 2A above. In FIG. 3, the inner layer 31 consists of a central core 34 of calcium chloride in a porous slab of conrete. Moisture is retained in the core 34 by plastic film 35 applied to the core faces, and tape 36 applied to the core ends.

Figure 3A:
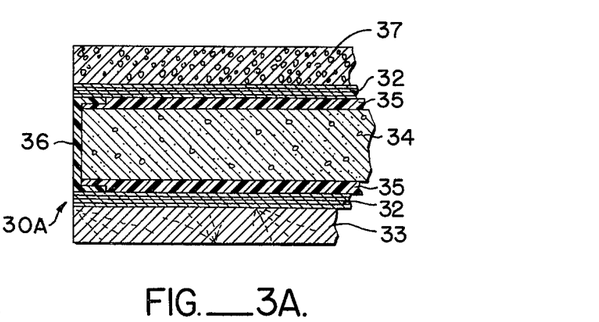
FIG. 3A is a sectional elevation of a further alternate of the embodiment of FIG. 2 and differs therefrom primarily by the further inclusion of an outer layer of thermal insulation.

FIG. 3A illustrates an alternate form of tile 30a wherein the acoustic tile 30 of FIG. 3 is modified by applying a thermal insulating layer 37 to the face of the tile 30a opposite the acoustic layer 33.

In the embodiments of FIGS. 3 and 3A, the acoustic layer 33 faces the room interior. Tiles 30, 30a may be installed in a conventional manner for ceiling tile e.g. with a thixiotropic adhesive dispensed from a cartridge gun.

The thermal insulation layer 37 is preferably a sheet of plastic foam from one to two inches thick. Urethane and styrene foams are satisfactory from a thermal standpoint, but are flammable and rapidly evolve flammable and poisonous gases when exposed to heat. Accordingly, in building construction, urea-phenolic foams are preferred. Nevertheless, the PCM thermal storage material 34 resembles the cement cladding used to protect building structural membes from loss of function during fires and, as a result, polystyrene foam may prove acceptable in building installations. The plastic foam is preferably adhered to the kraft paper surface 32 with water-based rubber latex contact adhesives conventionally used for polystyrene foam.

The acoustic layer 33 must have a good thermal conductivity and, therefore, thick porous wood fiber composites which are currently popular for acoustic absorbing and scattering surfaces in conventional acoustic tile are not preferred. However, comparable acoustical performance can be obtained with a material consisting of a semi-solid slurry of wood fibers, a starch binder, and a borax fire retardent which is spray applied directly onto the kraft paper 32 in a thin layer, on the order of approximately $\frac{1}{4}$ inch. After spraying, the coating 33 is dried with slightly elevated temperatures and forced air, whereupon it may be sprayed with a whitewash-type paint to provide a light reflective surface, such as a matte white finish. When the acoustic tile is installed in a room with the light reflective surface facing the room interior, it assists in minimizing energy consumption for lighting. The acoustic material should have a thermal conductivity in excess of about 0.5 BTU/ft.$^2$°F.hr.

d. Poured PCM Thermal Storage Material.

While the foregoing embodiments have been factory preformed, the present invention also relates to applications where the PCM thermal storage material is poured or molded on-site. In its simplest form, the cement mix and the PCM are either mixed together in a conventional cement mixer prior to molding, or they are simultaneously sprayed from separate nozzles into an on-site mold.

Applications for poured-on-site PCM storage material are manifold. For example, the modular thermal storage unit discussed hereinafter could be poured-on-site in a reusable mold. The material could also be used to pour floor pads for buildings with integral plastic pipes for hot water or ducts for hot air, thus providing a radiant heating floor with integral thermostatic thermal storage and integral thermal transfer properties. The material could also be used to form poured walls for use in integrated solar collector storage systems as discussed hereinafter, or in multi-story buildings utilizing conventional heating systems where it would be awkward and costly to support a second-story floor of PCM thermal storage material.

Also as mentioned to previously, poured PCM thermal storage material is utilized in one technique for factory fabrication of blocks of the type discussed in connection with FIGS. 1–1B and in fabrication of the laminates of FIGS. 2–3A. Pouring the material eliminates the relatively costly process of first filling cured blocks or slabs with a PCM and then coating them for water retention. Existing production facilities could be employed; for example, conventional cinder block factories could produce the block of FIGS. 1–1B with little or no investment in new equipment.

The preferred process for producing a poured material according to the present invention involves admixing cement, sand, sealing material and phase-change material; shaping such material in a mold; and curing the shaped material. If admixture occurs above the melting point of the phase-change material, it is useful to add a surfactant whereupon the PCM liquid tends to form a dispersion in the cement slurry so that the slurry is the continuous phase. When cured, the phase-change material is suspended and sealed in a concrete matrix.

In this process, there is a tendency for the PCM to inhibit curing of the cement. This problem can be allevated in several ways. First, the PCM used can be a wax. Thus, small particles of solid wax, in the range of 1/16 to ¼ inch in diameter, may be substituted for calcium chloride and other PCM's previously disclosed herein. Wax has several drawbacks including that, in order to get a well-defined melting point, suitable waxes are expensive; there is a formability problem; and the cured member must be coated to prevent the leakage of melted wax. While the latter two problems can be dealt with, the lack of a well-defined melting point at a low cost eliminates the thermostatic function of the material and restricts its application to the modular storage units discussed hereinafter.

Alternatively, an aqueous, inorganic phase-change material can be used, such material having the advantages of a well-defined melting point, low cost and nonflammability. In this embodiment, the rigid matrix can be a thermosetting polymer to prevent cure inhibition by the PCM. The particular polymer selected should have low cost, moderate physical strength and impermeability, and chemical resistance to the PCM. Polyethylene terephthalate is one such suitable material. Because of cost, these resins are preferably cut with a filler such as ash and/or wood fibers. The polyester-filler slurry is mixed with graded crystals of PCM, poured into a mold, and cured. In this instance, a nucleating agent must be incorporated in the phase-change material, since the thermosetting polymer itself will not nucleate crystal growth. If sodium sulfate decahydrate is the PCM, then borax is a preferred nucleating agent; if calcium chloride hexahydrate is the PCM, then barium hydroxide is a preferred nucleating agent. Both of these PCM-nucleating agent combinations are suitable for use in rigid matrix material of polyethylene terephthalate.

Alternately, wood pulp or blocks of wood could be used as the suspension medium. Blocks of wood would be employed in essentially the same manner as porous cement, being filled with liquid PCM under vacuum, and then coated with waterproof sealer.

In a further embodiment, PCM cure inhibition can be alleviated by making the cement itself impermeable by the addition of an aqueous emulsion of an organic substance such as polyvinylidene chloride or bitumen.

In a further embodiment, the PCM is in the form of individual graded crystals, on the order of ¼ inch in diameter, which are provided with an impermeable coating before adding to the cement mix. The coating can be a wax, bitumen or plastic film that is deposited on the PCM from an organic solution or by a surface reaction, as in conventional microencapsulation processes. Since such coatings are quite fragile, the coated crystals and the cement can be co-sprayed to prevent abrasion of the coating that would occur in a cement mixer. Alternately, the PCM can be sealed in small (for example, ½ inch diameter) plastic pouches that are mixed in with the cement.

e. Building Elements for a Solar Heated Wall.

Figure 4:
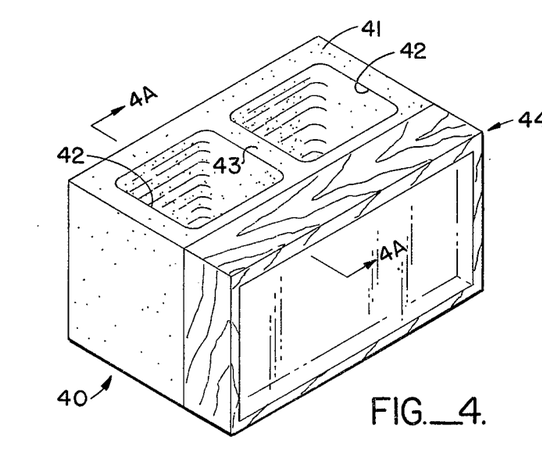
FIG. 4 is a perspective diagram of a novel building block according to the present invention for use in solar wall construction and which consists of the building block of FIG. 1 covered on one face with an outer layer of transparent weather shield and an inner layer of transparent thermal insulation.
Figure 4A:
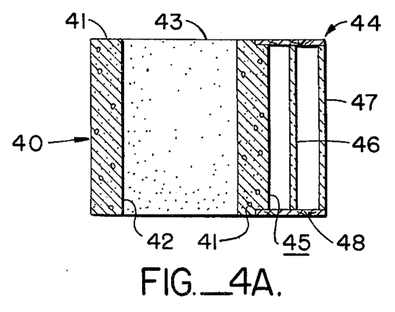
FIG. 4A is a sectional elevation of FIG. 4 taken along the line 4A—4A.

As illustrated in FIGS. 4 and 4A, the present invention relates to a modified building block 40 useful in the construction of solar heating walls. Blocks 40 of this type integrate wall structure, solar energy collection, thermal storage, thermal regulation, and thermal distribution. These functions are combined in a single modular element 40, or they may be achieved with specially constructed walls embodying laminate materials of the type discussed in connection with FIG. 2 in combination with special solar energy adaptors discussed in greater detail herein.

In particular, FIG. 4 illustrates a modular building element comprising a building block 41 of the type discussed in connection with FIG. 1. In particular, the block 41 is constructed of a phase-change material sealed in a rigid matrix of concrete or the like and is provided with a pair of passages 42 parallel to one another and separated by a divider portion 43.

A solar energy adaptor 44 is mounted on one face 45 of the block 41, with such face disposed parallel to the passages 42. The adaptor 44 consists of a sheet of transparent weather-resistant material 47 (preferably transparent glass reinforced acrylic plastic) disposed parallel to and in spaced relation to the block face 45. A layer of transparent insulation 46 is disposed between the weather-resistant layer 47 and the face 45, lying parallel to and spaced from each 47, 45. The transparent insulation 46 is preferably of the type developed by Suntek Corporation, disclosed in pending U.S. Patent Application Ser. No. 680,262, consisting of four spaced layers of a special plastic film having thermal conductance of 0.19 BTU/ft.$^2$hr.°F. and solar energy transmission of about 83%. Alternately, the transparent insulation can consist of a plastic film with a Drude mirror on one or both sides. A Drude or heat mirror transmits solar radiation but reflects thermal radiation.

The surface 45 is preferably dark in color so as to absorb on the order of approximately 90% of incident solar radiation.

The weather skin 47 and transparent insulation 46 are held in spaced parallel relation to the block face 45 by a frame 48 which may be of plywood or the like.

The transparent insulation 46 should have a thermal conductance of less than about 40 BTU/ft.$^2$hr.°F. and a solar energy transmission in excess of about 70%. Modules 40 constructed to these specifications will absorb at least about 75% of the solar energy reaching the surface 45 of block 41 through the transparent layers 46 and 47.

The module 40 functions as follows: Solar energy passes through the weather skin 47 and transparent insulation 46 and is absorbed on the dark surface 45 of the block 41. At this surface 45, the solar energy turns to heat which melts the phase-change material in the block 41, thereby storing heat in the module. Stored heat may be released directly into adjacent areas, or it may be used to heat air or other fluids carried through the passages 42 and transported to remote regions for remote heating. Specific applications for the module 40 of FIGS. 4 and 4A are discussed hereinafter in greater detail.

4. SYSTEMS EMBODYING PCM THERMAL STORAGE ARCHITECTURAL ELEMENTS AND BUILDING MATERIALS.

a. Thermal Storage Module Systems.

According to the present invention, blocks of the type described in connection with FIGS. 1, 1A and 1B are useful in novel thermal storage modules for buldings as shown for example, in FIGS. 5, 5A, 5B, and 5C of the drawings. Referring to the system of FIG. 5, a fuel-fired heater is thermally connected to a room or other region to be heated by means of hot and cold air ducts 51 and 52, respectively. Gates 54 and 55 are fully open (position C), the system operates in a conventional manner i.e. air heated by the heater 50 flows to the room through hot air duct 51; and cool air from the room is returned to the heater 50 by means of cool air duct 52. The foregoing conventional system is modified according to the present invention by the addition of a thermal storage module installation 56 which includes of a pile of PCM thermal storage blocks 10b of the type shown in FIG. 1B. The blocks 10b are arranged with passages 11b aligned in communication so that air flows therethrough in passing between gates 54 and 55. A thermally insulated closure member 57 with first and second ducts 58 and 59 which lead to the gates 54 and 55, respectively, from opposite ends of the closure 57.

Figure 5:
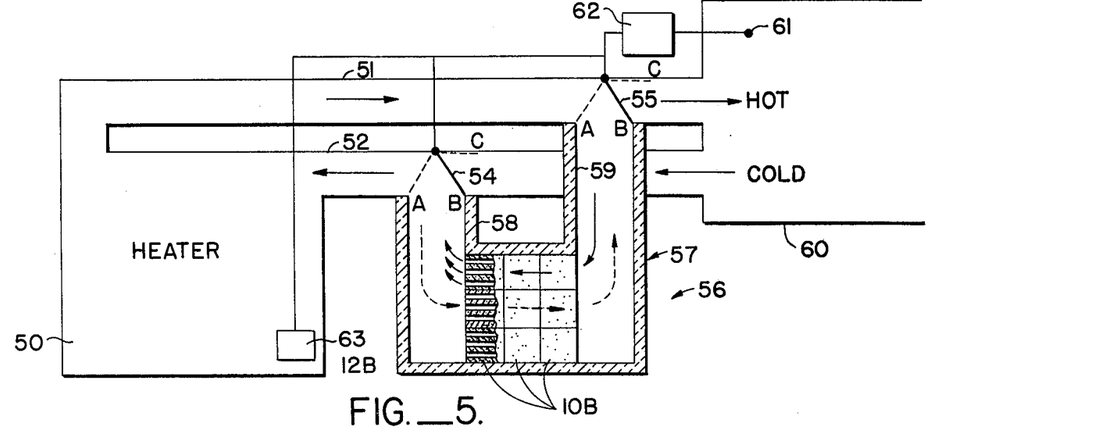

Control gates 54 and 55 are each movable among positions A, B and C. At positions A, the room is in thermal contact with the pile of thermal storage blocks 10b. At position B, the fuel-fired heater 50 is in thermal contact with the pile of thermal storage blocks 10b; and at position C, the fuel-fired heater 50 is in thermal contact with the room. When the control gates 54 and 55 are at position C, it may be desirable to provide further gates or other means to disconnect the pile of block 10b from the fuel-fired heater 50 and the room.

In operation, the heater 50 heats the room when gates 54 and 55 are at position C. Once the room has been heated to the desired temperature, a thermostat or other sensing means activates a switch 62 which moves gates 54 and 55 to position B, whereupon the heater 50 continues to fire but now heats the blocks 10b and not the room, thereby storing heat in the blocks 10b. The heater stops when the blocks are fully charged, that is, when the PCM in the blocks has melted completely. When temperature in the room 60 drops below a pre-selected temperature, the sensor 61 actuates the switch 62 to switch the gates 54 and 55 to position A. Heat leaves the blocks 10b passing out through duct 59, through duct 51 into the room 60; and cooled air in the room 60 passes through duct 52 into duct 58 and circulates through the blocks 10b. When the blocks 10b have been cooled below their melting point, sensor 61 activates switch 62 to switch gates 54 and 55 to position B; and, also, activates switch 63 to reactivate the heater 50. In this fashion, the length of the firing time of the heater 50 is extended and the number of firings is greatly reduced, thereby greatly increasing the efficiency of the heater.

In the foregoing system, the source temperature (i.e., the temperature of the fluid leaving the heater 50) is often 70° C. or more above the use temperature (i.e., the temperature of the room). Thus, an appropriate PCM for this architectural system will have a melting point anywhere between the source and use temperature, minus or plus a few degrees (5°–10° C.), respectively, to provide a thermal gradient for driving heat in and out of the phase change material.

Figure 5A:
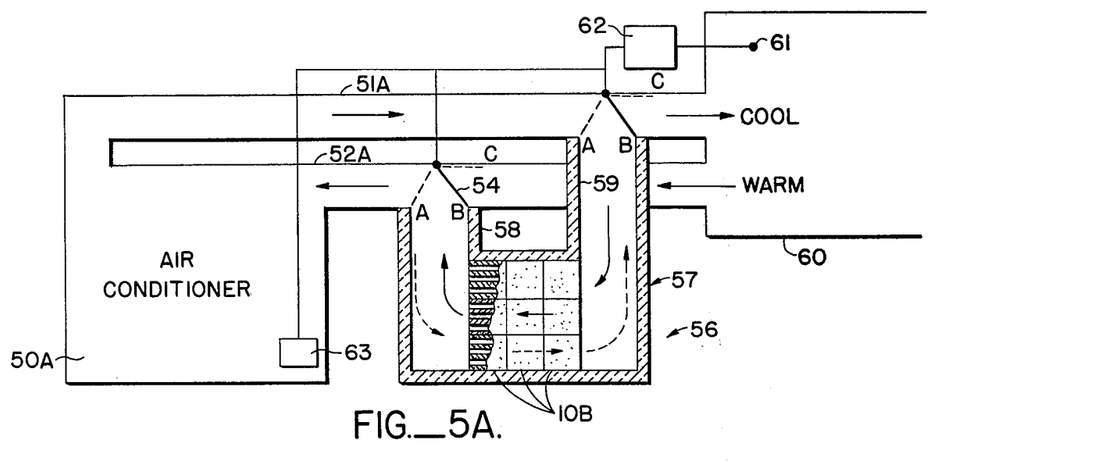

An alternate embodiment is illustrated in FIG. 5A where the thermal storage module installation 56 is incorporated into an air conditioning system comprised of an air conditioner 50a with cool air duct 51a and warm air return duct 52a. Otherwise, construction of the thermal storage module installation 56 is the same as the installation of FIG. 5. Like parts are denominated by like reference numerals.

Operation of the system of FIG. 5A corresponds to operation of the system of FIG. 5, except that the air conditioner 50 pumps cool air into the room 60 when the gates 54 and 55 are at position C; and into the thermal storage module 56 when the gates 54 and 55 are at position B. When gates 54 and 55 are at position A, cool air is released from the blocks 10B and enters room 60 through duct 59.

In contrast to the heating system of FIG. 5, the cooling system of FIG. 5A, employs phase change material with a melting point below the use (room) temperature.

It will be appreciated that the laminate building materials of FIGS. 2, 2A, 3 and 3A may be employed in the construction of thermal storage modules for use in air circulation systems of the type discussed in connection with FIGS. 5, 5A and 5C. In such embodiments, a plurality of laminate sheets may be stacked with wood or other means spacing the sheets to create air passages. Such stacks of lamina replace the stack of blocks 10b in FIGS. 5 and 5A.

Figure 5B:
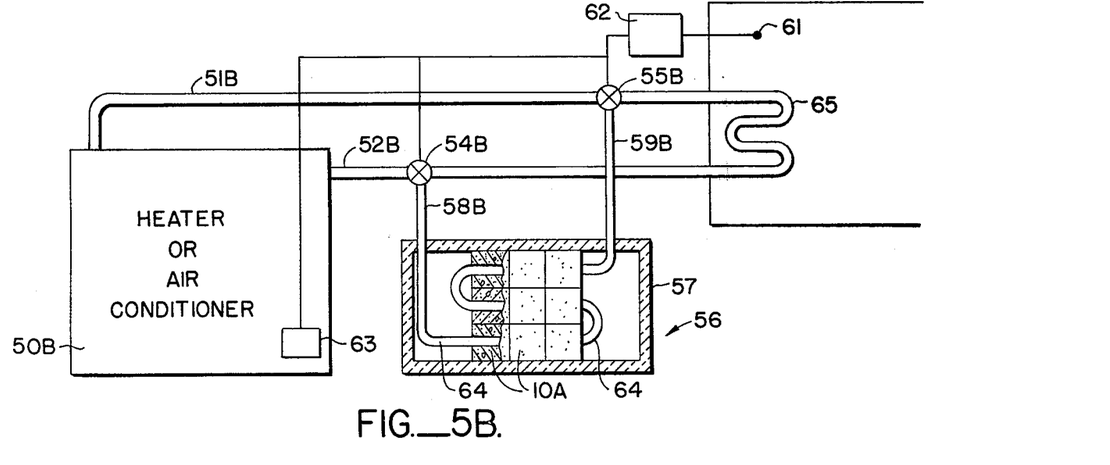

The systems of FIGS. 5 and 5A are forced air systems. The same effect can be achieved in water or other fluid circulation systems as indicated in FIG. 5B. Construction and operation of a water circulation system of the type shown in FIG. 5B, for heating and cooling systems, is comparable to the heating and cooling systems of FIGS. 5 and 5A respectively, where like parts are denominated by like reference numerals. Modifications from the forced air system include the use of delivery and return pipes 51b, respectively, and valves 54b and 55b replacing gates 54 and 55. Likewise, water from delivery and return pipes 51b and 52b are routed through the thermal storage module 56 by means of pipe 58b and 59b. The PCM thermal storage blocks 10a are preferably the type illustrated in FIG. 1A, having a single central passage 12a to accommodate the pipe 58b, 59b. Fluid from the system is in thermal contact with the room 60 by means of a radiator 65 or the like.

Operation of the air conditioning system of FIG. 5B corresponds to operation of the air conditioning system of FIG. 5A; whereas operation of the heater system of FIG. 5B corresponds to operation of the heater system of FIG. 5.

Installation of the systems of FIGS. 5, 5A and 5B may be by way of new construction, or they may be retrofitted to existing buildings. To minimize new duct work in forced air systems and plumbing and water systems, the thermal storage units 56 should be located near the heating and cooling units 50, 50a and 50b.

The systems of FIGS. 5, 5A and 5B have greatest utility for use in connection with fuel fired heaters and air conditioners since the economic advantage of such installations 56 involves lengthening the duty cycle of fuel fired units. A comparable, but less useful installation would be for electric heating and air conditioning systems whereby the electrical energy necessary to operate the heating or cooling unit would be minimized by operating the heater or air conditioner at off-peak hours to store heat or cool in the thermal storage module 56 for subsequent use during daytime or peak electrical usage hours. Similar applications involve installation of thermal storage units 56 in solar heated buildings to store heat from sunny periods for use during cloudy periods.

Figure 5C:
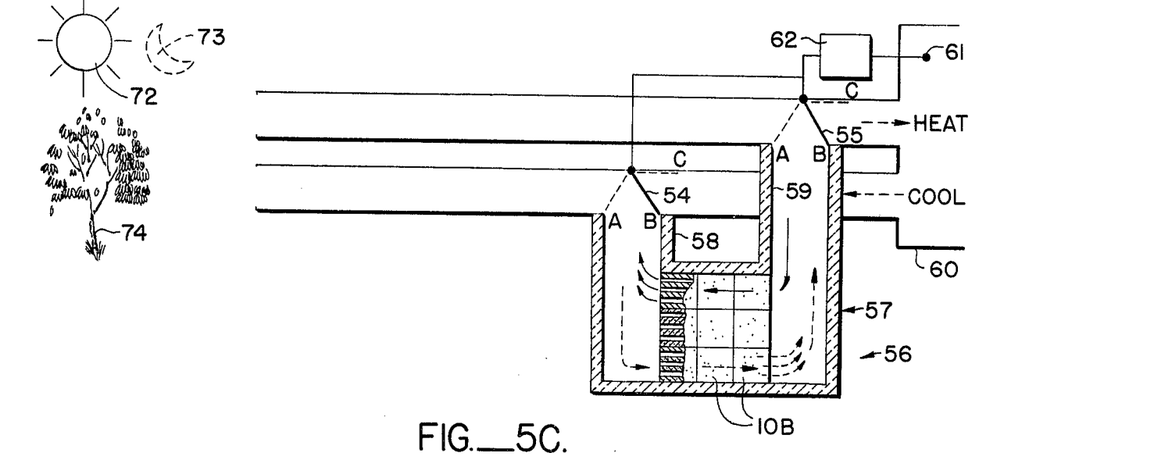

A variation of the systems depicted and described in connection with FIGS. 5, 5A and 5B is illustrated by FIG. 5C wherein components corresponding to the components of systems 5, 5A and 5B are depicted by like reference numerals. The system of FIG. 5C differs from the prior systems primarily in that heat and/or cool from the outdoors 74 (as opposed to heat or cool from a heater or air conditioner) is stored in the PCM blocks 10b of a thermal storage module installation 56 for use in cooling a room 60. The heating and cooling systems 50, 50A and 50B of previously described systems are, thus, substituted by the ambient atmosphere. The system of FIG. 5C brings air into the system from the atmosphere through duct 51c and air exists from the system from return duct 52c. Gates 70 and 71 open ducts 51c and 52c, respectively, when switch 63 switches gate 70, 71 to position D; whereas, gates 70, 71 close when switched to position E.

In heating operation, in climates where daytime temperatures exceed the comfort zone temperature, but where nighttime temperatures drop below the comfort zone, during daytime hours 72, gates 54 and 55 locate at position B, thereby placing the thermal storage blocks 10b in thermal contact with the out-of-doors 74. At nighttime gates 54 and 55 move to position A, thereby disconnecting the thermal storage module 56 from the out-of-doors 74 and connecting it with the room 60; whereupon heat stored in the blocks 10b is released into the room 60 during the night 73.

The foregoing system is likewise applicable to store cool from the nighttime 73 for cooling the room 60 during the daytime 72. In such applications, gates 54 and 55 are positioned at B during the nighttime and at A during the daytime, during which time heat is drawn out of the room 60 and stored in the blocks 10B, thereby cooling the room 60, literally using "stored cool".

In the system of FIG. 5C, where the PCM has been selected to have a melting point at or about room temperature, the thermal storage module 56 can be used to store both heat and cool.

We sometimes refer to the foregoing technique, whereby the most favorable ambient temperature is brought into the sustained in the living area, as the "ratchet effect".

It is apparent that the ratchet effect may be used in conjunction with the systems discussed in connection with FIGS. 5, 5A and 5B. For example, a heater and/or air conditioner might be used in conjunction with heating and/or cooling from the out-of-doors, by having the duct work 51 and 52 branch leading to the out-of-doors 74, and a heater 50, 50b, and/or air conditioner 50a,b. Likewise, it is a simple matter to utilize a heater and an air conditioner in the same system, requiring only conventional switching and duct work as is customary in the combined installatiion of heaters and air conditioners in conventional HVAC installations. It should be noted that thermal access to the outdoors 74 by the heat and cool storage module 57 results in greatly reduced heating and cooling energy comsumption during certain seasons and climates.

The thermal storage modules 56 illustrated in connection with the embodiments of FIGS. 5, 5A, 5B and 5C are typically compact and easy-to-install, provide good thermal installation, are non-flammable and have a long life. To store a day's worth of heat in a typical single family residence during the month of January in a climate similar to Washington, D. C., requires approximately $2.5 \times 10^5$ BTU. With an energy density of 90 BTU/lb. and a density of 110 lb/ft$^3$, and assuming that 30 percent of the volume is used for air passages, the overall volume of blocks 10a, 10b required to storage $2.5 \times 10^5$ BTU is 40 ft$^3$. Thus, including insulation, the storage module 56 can be fitted in a cube 3-½ feet on a side. The storage module 56 is thus compact and, if the blocks are constructed to weigh no more than 30 pounds to comply with labor requirements of the construction trade, only 30 blocks would be required. No mortar is needed, since the blocks can be merely stacked. The walls of insulation box 57 surrounding the blocks 10a, 10b, including the inlet and outlet ducts 58 and 59, are preferably of 1 inch thick phenolic foam sheets with an aluminum foil facing. These sheets can be assembled with aluminum foil adhesive tape following standard HAVC practice.

The blocks 10, 10a and 10b must remain completely waterproof during the fairly rough handling that they are likely to receive from the building trades. The blocks should also be strong enough to support their own weight, and should have a cycle life comparable to the intended life of the structure. Thus, in a climate where the system cycles 100 times during an entire heating season, the required cycle life of the block 10 in a building having an intended life of 50 years is 5,000 cycles.

b. Distributed Systems

The PCM thermal storage material and elements described in connection with FIGS. 1, 1A, 1B, 2, 2A, 3 and, to some extent, FIG. 4, are suitable for use in distributed systems, i.e., systems in which the PCM thermal storage material or element forms the walls, partitions, and/or floors of buildings. In this manner, integral heat storage in the structure of the building itself would be provided. In such systems, heat present during relatively warm periods is stored in the PCM thermal storage material for release and heating during relatively cool periods. Conversely, cool from relatively cool periods is stored in the PCM thermal storage material for release during relatively warm periods. Systems of this sort are desirable, not only for their thermal storage advantages, but also because they provide thermostatic qualities enabling the room to maintain a given desired temperature despite fluctuations in the ambient temperature or on-off operation of furnaces, air conditioners or the like.

Since the heat is stored in a phase change material as the latent heat of fusion rather than as sensible heat, it is possible to have a relatively high energy density without temperature excursions outside the comfort zone. All of the heat stored in a change of phase can be utilized because the phase change material is in immediate thermal contact with the use area. In other words, since the wall and/or floor are storing the heat, only a few degrees temperature gradient are necessary to drive the heat from the storage to the use area. By comparison, the systems disclosed and described in connection with FIGS. 5–5C, require that the heat be transported by a medium such as air or water into the use area. Because of the smaller heat transfer areas involved and the physical separation of storage and use areas, heat (or cool)

must generally be stored several degrees above (or below) its use temperature. Since a similar thermal gradient is not required in distributed storage systems, both heat and cool can be stored at the same temperature. For example, if the phase change material melts in the middle of the comfort zone, the two or three degrees excursion on either side of its melting point that is necessary to drive heat or cool from storage into the room does not let the room's temperature depart from the comfort zone. As a result, as stated above, the distributed thermal storage material of the present invention is intrinsically thermostatic and serves to hold room temperature within a fairly narrow range until the phase change material is either all melted or all frozen.

Since the PCM thermal storage materials of the present invention are suitable for use as structural materials, the foregoing advantages may be accomplished by simply substituting conventional structural material such as building block, drywall and the like with similar configurations constructed with the compositions of the present invention.

Figure 6:
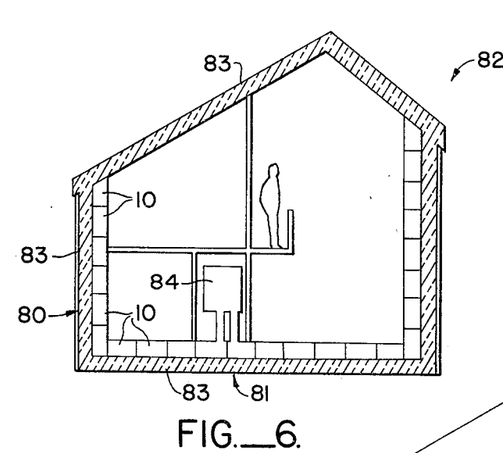
FIG. 6 is a schematic diagram of a house with walls formed of building blocks of the type depicted in FIG. 1 providing distributed thermal storage.
Figure 6A:
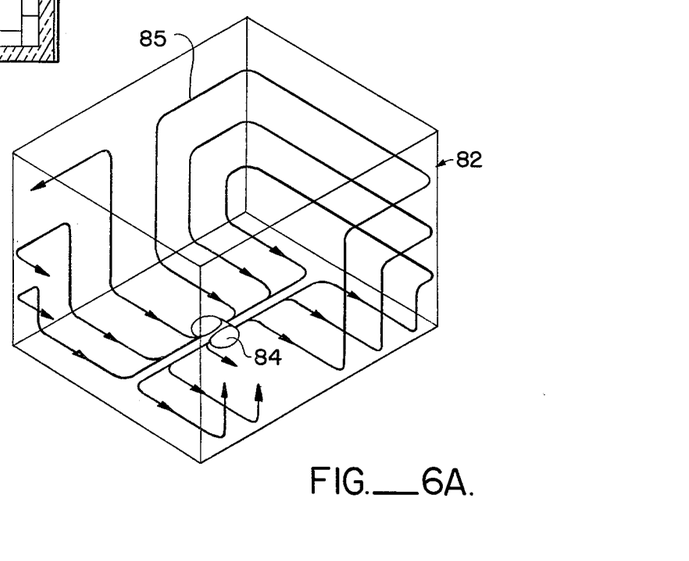
Figure 6B:
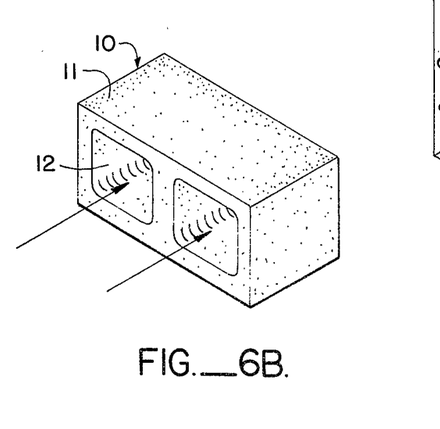
FIG. 6B depicts building blocks of the type employed in the house of FIG. 6.

For example, FIGS. 6, 6A and 6B depict a system wherein the walls 80 and/or floor 81 of a house 82 are constructed of PCM thermal storage material building blocks 10 of the type shown in FIG. 1. The blocks 10 have a pair of large parallel passages 12 and are installed with those passages aligned to permit circulation of air through the walls and the floors as indicated in FIG. 6A.

Referring to FIG. 6, the structural walls and flooring are covered with an exterior shell of conventional thermal insulation 83. Heat or cool from the air heater and/or air conditioner 84 is pumped into the interior block passages 12, rather than into the room itself, so that the room is thus immersed in a "thermostatic bath" of constant temperature walls and floors. Thus, in the system of FIG. 6, the heat or cool radiating areas controlling temperature in the living area are larger than conventional radiant wall or floor heaters providing a highly uniform method of space heating with superior comfort.

As depicted in FIG. 6A, the passages 12 of blocks 10 are arranged to create continuous loops 85 of circulation from the heater or cooler 84. These loops surround the building with the necessary thermal input so that the heat flows from the heater/cooler 84 to the outside only through the insulation 83. By comparison, with a non-distributed heating system, heat flows from the heater to the outside through the living area, creating thermal gradients within the living area, and consequent discomfort for the occupants.

c. Solar Wall Systems

Figure 7:
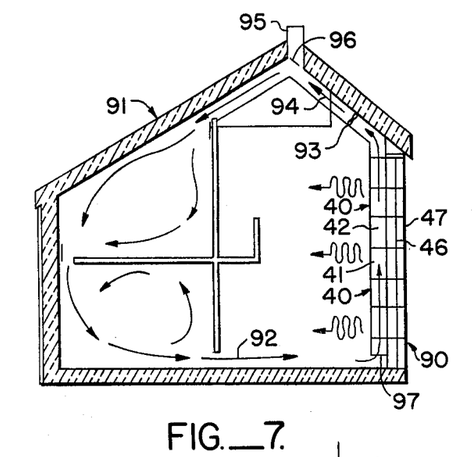
FIG. 7 is a schematic sectional elevation of a house having a solar heating wall constructed of the solar heating building blocks of FIG. 4A.

FIG. 7 illustrates a solar wall heating system employing the solar heating building blocks 40 previously described in connection with FIG. 4 and 4A. In FIG. 7, the south wall 90 of a building 91 is constructed of solar building blocks 40 which have a transparent weather resistant skin 47 and a transparent insulated panel 46 arranged outwardly of the PCM thermal storage material block 41. Blocks 40 also have aligned internal passages which provide passages 42 in the wall for circulation of air currents 92. The vertical passages 42 lead to a ceiling passage 94 which distributes air 92 leaving the solar heating wall to remote portions of the building. It required, a fan 93 may be provided to assist circulation. A vent 95 leads between the passage 94 and the ambient atmosphere. The vent 95 is openable and closeable by means of control member 96.

In operation, solar energy impinging upon the south wall 90 of the building 91 passes through the weather skin 47 and thermal insulator 46, being absorbed by the thermal storage block 40 whereupon it turns to heat and heats the air 92 located in the passage 42. The heated air 92 rises in the passage 42 into the manifold 94 where it is distributed into the various rooms. As the air 92 gives up its heat, it sinks to the bottom of the building and returns to an opening 97 at the bottom end of the solar wall passage 42. Solar heat stored in the blocks 40 is released into the building interior by both radiation and convection. Accordingly, preferably, those rooms adjoining the radiating wall 90 would require less convective heating and therefore would receive relatively small amounts of circulating air 92 from the manifold 94.

Figure 8:
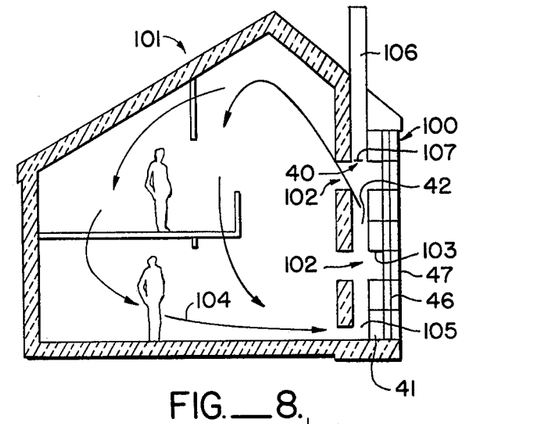
FIG. 8 is a schematic sectional elevation of a house retrofitted with a solar wall constructed of the solar heating building blocks of FIG. 4A according to the present invention and having windows therein.

An alternate embodiment is depicted in FIG. 8 wherein the south wall 100 of a building 101 is fitted with a plurality of thermal storage blocks 40 of the type depicted in FIG. 4. The embodiment of FIG. 8 differs primarily from the embodiment of FIG. 7 in that the south wall 100 has windows 102. The windows 102 are formed by horizontally aligned openings 103 in the structural material 41. Transparent insulation 46 and transparent weather skin 47 cover the entire surface of the south wall 100, but do not obstruct vision through the windows 102. Air 104 circulates through the passage 42 and/or the internal passages in structural wall 41. Air which becomes heated in the passage 42 is vented into the room through the window apertures 102; whereas, cold air 104 returns from the room to the passage 42 via a vent 105 at the base of the wall. The passage 42 is vented to the ambient atmosphere by means of vent 106 which is controllable for opening and closing by control member 107.

The principal distinction between solar walls of FIGS. 7 and 8 is that the wall of FIG. 8 can be retrofitted to any building which has an exposed south wall and a few windows in that wall. This wall is constructed in the following manner: First a cement pad is poured; next, a wall of blocks 40 is stacked up using conventional cinder block construction techniques. Where windows exist in the building's south wall, openings are provided in the module 41 so that light from the out-of-doors only need pass through the weatherskin 47 and transparent insulation 46 (which is optional).

In retrofit installations, the wall of the existing building cannot be used to transfer heat if it is insulated; so, instead, head is transferred from the passage 42 through the windows 102. This occurs naturally through convection. In order to augment this chimney effect, a phase change material is used with a higher melting point than is used in new construction installations described previously. This does not cause discomfort in the living area from overheating because the thermal storage blocks 41 are separated from the living area by the existing insulated wall and the windows 102 can be closed. In the systems of FIGS. 7 and 8, the controllable vents 95 and 106 are useful in the summer to vent heat collected from diffuse radiation to ventilate the entire building and thereby provide cooling.

Summer overheating can also be prevented by using appropriate overhangs or the like which shade the wall when the sun is high in the sky. Suitable overhangs and the like are depicted in FIGS. 9A, B and C.

Figure 9A:
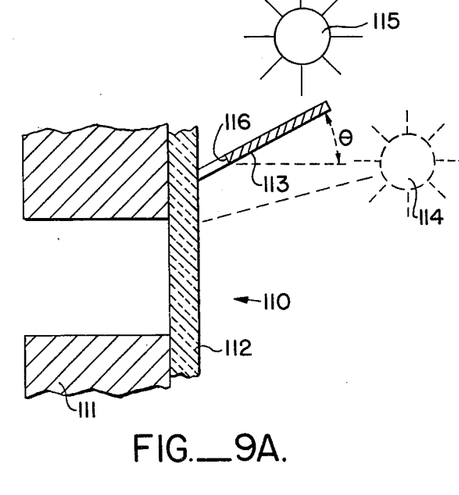
FIGS. 9A–9C illustrate means for preventing over heating of south facing solar walls including a single upper overhang (FIG. 9A, a plurality of small exterior louvers (FIG. 9B) and an exterior facing layer of optical shutter material (FIG. 9C).
Figure 9B:
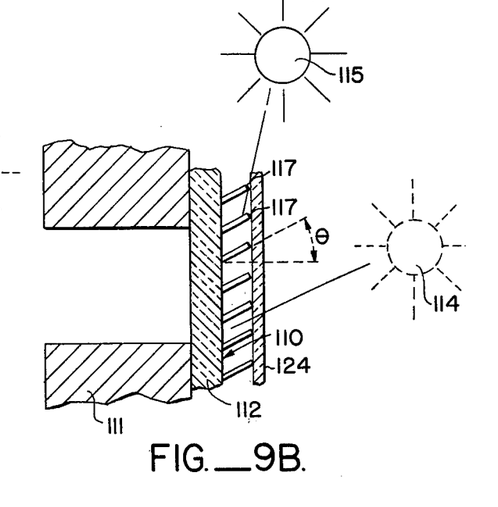
Figure 9C:
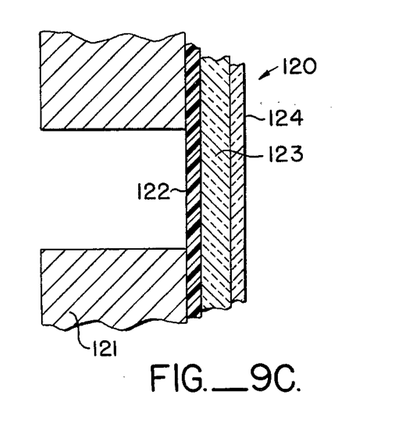

In FIG. 9A, the solar wall 110 consists of phase change thermal storage material 111 and transparent insulation 112. An overhang 113 is mounted at an angle θ relative to the horizon on the outer surface of the wall 110. During the winter, winter sun 114 is low on the horizon and shines on the wall 110 without interference from the overhang 113. During the summer, when summer sun 115 is high, overhang 113 shades the wall 110. The overhang, when mounted on the wall 110, is provided with one or more openings 116 at the junction between the wall 110 and overhang 113 to permit drainage of snow, rain and other precipitate matter which would otherwise collect there.

In FIG. 9B, the solar wall 110 of FIG. 9A is provided with a plurality of small, vertically spaced, horizontal overhangs or louvers 117 mounted on the exterior surface of the solar wall 110 and disposed at an angle θ, which is selected to be in the range of from 0 degrees to 45 degrees, depending upon the latitude of the installation. The transparent weather skin 124 may be placed outside the louvers 117.

In FIG. 9C, the solar wall 120 consists of structural phase change thermal storage blocks 121, a layer of optical shuttering material 122, a layer of transparent insulation 123 and a transparent weather skin 124 which protects the wall 120 from the elements. The optical shutter material 122 is a layer which turns specularly or diffusely reflective above a certain predetermined temperature. Such temperature is preferably selected so that the optical shutter 122 turns reflective at temperatures typically about 5 degrees centigrade above the melting point of the phase change material. Suitable optical shuttering films are disclosed in U.S. Patent Application Ser. No. 680,262 filed Apr. 26, 1976 by John Brookes and Day Chahroudi.

The overhang 113 of FIG. 9A, the slats 117 of FIG. 9B, and the optical shutter 122 of FIG. 9C could be employed with other constructions of solar wall and/or building block, such as are disclosed and described in connection with FIGS. 4A, 7 and 8.

5. NONRIGID MATRIX PCM THERMAL STORAGE ELEMENTS, STRUCTURAL AND NONSTRUCTURAL

Figure 10A:
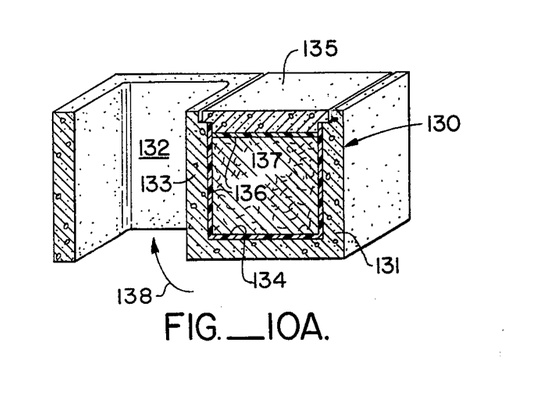
FIG. 10A is a sectional elevation of a structural building block housing phase change material in a non-structural matrix.
Figure 10B:
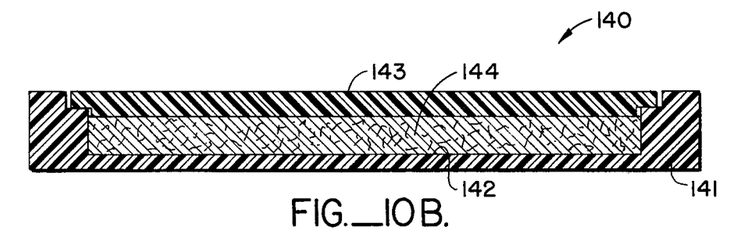
FIG. 10B is a sectional elevation of a ceiling or wall tile housing phase change material in a non-structural matrix.
Figure 11:
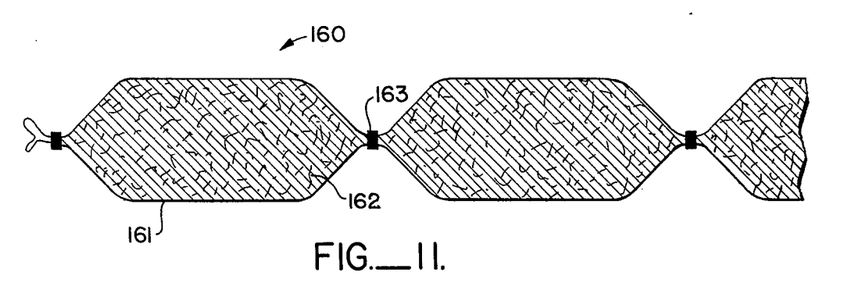
FIG. 11 is an elevated diagram of a sausage-like configuration of phase change material sealed in a flexible plastic tubing and suspended in a nonrigid matrix.

The systems discussed above in Section 4 are, in many instances, suitable for use with architectural elements and building materials constructed differently from those previously described. FIGS. 10A,B and 11 depict alternate styles of novel phase change material elements generally useful in building and in the systems described in Section 4.

FIG. 10A depicts a building block according to the present invention which consists of a container or support member 131 of concrete or other structural material. The block is generally rectangular in cross-section with an air passage 132 in one side separated by a divider portion 133 from a cavity 134 in the opposite side of the block 130. The cavity 134 is provided with a lid 135 and its interior surfaces are coated with a sealing material 136. The cavity 134 is filled with nonrigid PCM thermal storage material 137. Unlike previous embodiments, the suspension medium for the PCM thermal storage material 137 is non-structural and may consist of wood pulp, starch, silica, or other suitable similar materials. A typical formulation, by weight, is as follows:

45% $Na_2SO_4$
2% $Na_2B_2O_7$
3% wood pulp
50% $H_2O$

The cap 135 is sealed in place with a waterproof cement or plastic material. The sealant coating 136 may be silica, polyester and sand, bitumen, polyester, or other material which is impervious to the phase change material in both solid and liquid form. Passage 132 is provided for air currents 138 for conveying heat to and from the phase change material 137 in systems of the type described previously (such as in the system of FIGS. 6,6A), or otherwise.

FIG. 10B depicts a ceiling tile 140 which consists of a plastic tray portion 141 having a central container cavity 142, a lid 143 for closing the cavity 142 and nonrigid PCM thermal storage material 144 in the cavity 142. The material 144 may be of the same type described in connection with the embodiment of FIG. 10A. The lid 143 is sealed to the tray 141 with adhesive materials. The lid 143 is preferably flexible to accommodate expansion and contraction during melting and freezing of the phase change material. The plastic tray 141 may be of vacuum formed polyvinylchloride. The bottom (room facing) surface of the tile 140 may be covered with acoustic material if desired.

With minor modifications in appearance, rigidity, and size, the tile of FIG. 10B may be modified for use as a wall tile.

Figure 10C:
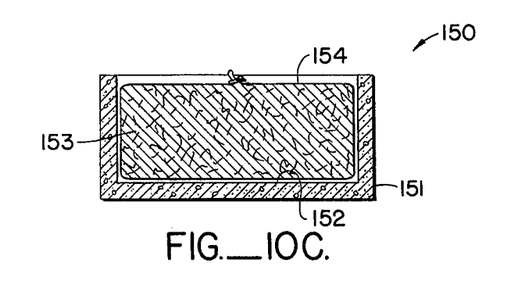
FIG. 10C is an alternate embodiment of a building block housing phase change material in a non-structural matrix, the phase change material being sealed in a plastic pouch and held in an interior cavity of the building block.

FIG. 10C illustrates a further embodiment of building blocks wherein the blocks 150 consist of a rectangular walled container portion 151 of concrete or the like with an open top and a central container cavity 152. Nonrigid PCM thermal storage material 143 is sealed in a flexible plastic pouch 154 and located in the container cavity 152. Blocks 150 of this type may be stacked in constructing walls and thermal storage modules of the types previously described.

FIG. 11 depicts a thermal storage control element 160 consisting of a tube of flexible plastic material 161 filled with nonrigid PCM thermal storage material 162 and tied at intervals 163 to provide a sausage-like member. The phase change materials 162, 153 of this embodiment and of the embodiment of FIG. 10C may both be of the nonrigid type discussed in connection with FIG. 10A above.

The sausage-like thermal storage control member 160 of FIG. 11 may be installed in or behind existing or newly constructed walls, attics, beneath floors, etc. to provide phase change material thermal storage advantages of the type described.

6. PHASE CHANGE PRESSURE CONTROL

When a PCM goes from solid to liquid phase, it expands; and, when PCM goes from liquid to solid, it contracts. When the phase change material is sealed in a rigid suspension medium or otherwise, enormous pressures and/or vacuums result unless the package is expansible with pressure or contracts when a vacuum occurs. Typically the rigid matrix material itself is not injured by the expanding PCM because such expansion occurs (unlike water) when the PCM goes from solid to liquid phase and is free to flow as it expands; however, such forces tend to be destructive of the sealant.

A solution to this difficulty involves admixing, along with the molten phase-change material, a fraction of a percent of a liquid which boils at the melting point of the PCM, and which is chemically inert in the presence of the other ingredients. We refer to such liquids as "pressure control liquids". Suitable pressure control liquids include (for melting points at room temperature) hydrocarbons such as pentave, butane, and methylene diamine; and halocarbons such as perfluorobutane and methylene dibromide. The admixture is sealed in the package when the phase change material is in liquid phase. When the phase change material contracts on freezing, pressure on the pressure control liquid is relieved and it expands accordingly. As the phase change material melts, its increased pressure condenses the pressure control liquid. Most materials suitable for use as pressure control liquids (and, in fact, most liquids) expand several hundred times their liquid volume upon boiling; whereas the freon typically expands by approximately 500 times its liquid volume when boiled; whereas most phase change materials only expand by 5 to 15 percent in passing from the solid to liquid phase. As a result, only small quantities of freon are necessary. The precise ratios depend upon the precise properties of the materials selected. However, an excess of the pressure control liquid will not increase the pressure in the system when the PCM is melted. For improved distribution of the pressure control liquid, a liquid such as ammonia which is soluble in the molten phase change material should be selected. Of course, the pressure control liquid and sealant must be selected so the pressure control liquid does not attack or pass through the sealant. In a typical formulation, the PCM is $CaCl_2.6-H_2O$ (70% by volume of the bulk); the suspension medium is air entrained concrete (29%); the pressure control liquid is $C_4F_{10}$(1%); and, the sealing material is a 30% polyester, 70% sand mixture.

7. ICE FREE SURFACES

In climates where ice forms on the surfaces of sidewalks, streets, highways, bridges, and other structural objects normally formed of concrete or other conventional structural materials, the compositions of the present invention can be advantageously employed to provide suitable pre-formed elements (such as tiles) or poured-on-site installations (such as roadways) which will store and release heat to retard or prevent surface ice formation.

In such applications, the melting point of the phase change material is selected to be a few (preferably 2°-3° C.) degrees above the freezing point of water (32° F.). When the average daily temperature of the atmosphere is higher than the melting point of the PCM, ice will never form on the surface of the composition. If the average daily temperature drops below the melting point of the PCM, then surface ice can form, but it will tend to form later and melt sooner than if conventional materials had been used.

Sidewalk tiles can be constructed, for example, of PCM thermal storage material formed in the same fashion as the building blocks described herein at Section 3(a) and of the same materials. Thus, sidewalk tiles can be formed by admixing all components together in the mold, or by vacuum filling a porous tile and sealing it with a waterproof coating. Tiles of different sizes, shapes and combinations are formed by simply using different molds.

Alternately, the tiles can be poured on site, as described in section 3(d) hereof, with the same material.

Roads, pathways and roadbeds designed for vehicles can also be constructed of the materials of the present invention. Preferably cement, aggregate, PCM, and sealing material are poured on site. Where, as in highways, and streets, the abrasive qualities of vehicle tires or wheels may be injurious to the composition, a layer of conventional road material can be laid down atop the composition. Such conventional materials should be selected to provide good thermal contact between the PCM composition and the road surface, so relatively conductive materials are generally preferable, as are materials which can be laid down in relatively thin layers. Conventional concrete meets these requirements adequately. Road and highway applications of the present invention have particular utility on bridges where freezing usually occurs most readily.

I claim:

1. A building element adapted to inhibit the change of the interior temperature of a building beyond prescribed temperature limits approximating room temperature, said element comprising:
   a rigid porous matrix structure in thermal communication with the building interior;
   a store of phase change material impregnating said matrix structure and having a melting point within said temperature limits so that said material melts when the interior temperature of the building exceeds the temperature limits to absorb heat and reduce the interior temperature until the store of material is entirely melted, and conversely said material freezes when the interior temperature of the building falls below the temperature limits to release heat and increase the interior temperature until the store of material is entirely frozen; and
   means for sealing the store of material within the matrix structure so that the material undergoes repeated changes in phase between liquid and solid to maintain the interior temperature of the building within the prescribed limits.

2. The building element of claim 1 wherein said matrix structure in an inorganic hydrate material.

3. The building element of claim 1 wherein said matrix structure is a thermosetting polymer.

4. The building element of claim 1 wherein said rigid matrix is concrete.

5. The building element of claim 1 wherein the sealing means comprises a coating of a sealing material on said matrix structure.

6. The building element of claim 1 wherein said store of phase change material comprises a hydrated salt.

7. The building element of claim 1 wherein said matrix includes a passage therein having openings communicating with the interior of the building for the circulation of air from the interior of the building through the element.

8. The building element of claim 1 wherein the matrix structure is load-bearing.

9. The building element of claim 1 wherein the matrix structure is non-load bearing.

10. The building element of claim 1 and additionally comprising a pressure control liquid impregnating the matrix structure in combination with the store of phase change material, said liquid having a boiling temperature approximately equal to the melting point of the material so that the liquid accommodates changes in volume caused by melting of said material.

11. The building element of claim 10 wherein said liquid is a halogenated hydrocarbon.

12. A building element adapted to inhibit the change of the interior temperature of a building beyond prescribed temperature limits approximating room temperature, said element comprising:
   a concrete block having at least 40% interconnected pores in thermal communication with the building interior;

a store of phase change material impregnating the concrete block and having a melting point within said temperature limits so that said material melts when the interior temperature of the building exceeds the temperature limits to absorb heat and reduce the interior temperature of the building until the store of material is entirely melted, and conversely said material freezes when the interior temperature of the building falls below the temperature limits to release heat and increase the interior temperature until the store of material is entirely frozen; and a layer of sealing material circumscribing the concrete block to seal the store of material therein so that said material undergoes repeated changes in phase between liquid and solid to maintain the interior temperature of the building within the prescribed limits.

13. A building element adapted to inhibit the change of the interior temperature of a building beyond prescribed temperature limits approximating room temperature, said element comprising:

a concrete wall in thermal communication with the building interior;

a store of phase change material impregnating the concrete wall and having a melting point within said temperature limits so that said material melts when the interior temperature of the building exceeds the temperature limits to absorb heat and reduce the interior temperature of the building until the store of material is entirely melted, and conversely said material freezes when the interior temperature of the building falls below the temperature limits to release heat and increase the interior temperature until the store of material is entirely frozen; and a quantity of sealing material impregnating the concrete wall to seal the store of material therein so that said material undergoes repeated changes in phase between liquid and solid to maintain the interior temperature of the building within the prescribed limits.

14. The building element of claim 13 wherein the concrete wall is vertical.

15. A method for constructing a building material adapted to maintain the temperature within the building between selected temperature limits approximating room temperature, said method comprising the steps of:

admixing cement, sand, sealing material, water, and a phase change material having a melting point within the selected temperature limits, which phase change material undergoes reversible freeze-thaw cyclical changes when subjected to appropriate temperatures above or below said selected temperature limits;

pouring the admixture into a mold; and causing the molded admixture to form a rigid structural material in which the phase change material is suspended and sealed in a matrix formed from the other components of the admixture.

16. The method of claim 15 wherein said phase change material is in the form of crystals, and additionally comprising the step of coating said crystals prior to said admixing step to prevent the phase change material from retarding cement cure.

17. The method of claim 15 and additionally comprising the step of sealing the phase change material in small plastic pouches prior to said admixing step.

18. The method of claim 15 wherein said admixing step further includes admixing a surfactant.

19. A building material constructed according to the method of claim 15.

* * * * *